(12) United States Patent
Amberger et al.

(10) Patent No.: US 8,174,761 B2
(45) Date of Patent: May 8, 2012

(54) TOTAL INTERNAL REFLECTION INTERFEROMETER WITH LATERALLY STRUCTURED ILLUMINATION

(75) Inventors: Roman Amberger, Hockenheim (DE); Christoph Cremer, Heidelberg (DE); Heinz Eipel, Bensheim (DE)

(73) Assignee: Universitat Heidelberg (DE)

( * ) Notice: Subject to any disclaimer, the term of this patent is extended or adjusted under 35 U.S.C. 154(b) by 224 days.

(21) Appl. No.: 12/481,927

(22) Filed: Jun. 10, 2009

(65) Prior Publication Data

US 2010/0315708 A1    Dec. 16, 2010

(51) Int. Cl.
*G02B 21/00* (2006.01)
(52) U.S. Cl. ........................................ 359/368; 359/385
(58) Field of Classification Search .......... 359/368–390, 359/558–576
See application file for complete search history.

(56) References Cited

U.S. PATENT DOCUMENTS

| | | | | |
|---|---|---|---|---|
| 5,945,674 A * | 8/1999 | Dukor | | 250/339.11 |
| 6,351,307 B1 * | 2/2002 | Erskine | | 356/451 |
| 7,369,308 B2 * | 5/2008 | Tsuruta et al. | | 359/388 |
| 7,889,348 B2 * | 2/2011 | Tearney et al. | | 356/451 |
| 2008/0018966 A1 * | 1/2008 | Dubois et al. | | 359/9 |
| 2009/0219607 A1 * | 9/2009 | Saggau et al. | | 359/305 |

* cited by examiner

Primary Examiner — Thong Nguyen
(74) Attorney, Agent, or Firm — Gerald E. Hespos; Michael J. Porco

(57) ABSTRACT

A total internal reflection microscope for epi-fluorescence illumination observations includes an objective through which an object to be observed is illuminated by an excitation illumination light at an angle to an observation axis of the microscope. The angle is adjustable to be within the range suitable for a total internal reflection observation. The microscope also has a source of collimated excitation light. An interferometer is arranged in the optical path of the collimated excitation light and is configured to produce an interference pattern. A focusing lens system focuses the interference pattern produced by the interferometer into the back focal plane of the objective. The objective and the focusing lens system image the interference pattern produced by the interferometer into the conjugated image plane of the objective, thereby producing excitation illumination light that modulated spatially in intensity in a plane orthogonal to the observation axis of the microscope.

15 Claims, 2 Drawing Sheets

TOTAL INTERNAL REFLECTION INTERFEROMETER WITH LATERALLY STRUCTURED ILLUMINATION

BACKGROUND OF THE INVENTION

Structured illumination has been used to substantially enhance localization precision in microscopy. Hausmann et al (U.S. Pat. No. 7,342,717 B1) have used a standing-wave interference pattern in the observation axis between two microscope objectives to measure both phase and amplitude of fluorescence excitation by moving the objects in the direction of observation (Z-axis) through the fluorescence excitation standing-wave field and observing fluorescence emission. By making use of the information both from the phase and the amplitude of the standing wave field, not only object-to-object localizations in the Z-axis (i.e. along the optical axis or the axis of observation) could be measured with a precision of some ten nanometers but also object size estimations in the range of 20 to 150 nm were obtained, previously not possible using conventional light microscopy.

Successful attempts to use laterally structured illumination, i.e. illumination structured in the plane orthogonal to the direction of observation have been reported (Reto Fiolka et al, OPTICS LETTERS, Vol. 33, No. 14, 1629-1631, 2008). A method combining structured illumination in the plane of observation with total internal reflection fluorescence illumination (TIRF) has been disclosed in U.S. Pat. No. 6,987,609 B2.

A drawback of previously disclosed methods to feed the interfering light beams into the observation plane (i.e. plane orthogonal to the direction of observation or X-Y-plane) for TIRF microscopy is that they are complicated. Thus for example, if small prisms or mirrors are used within the microscope objective area, the mechanical adjustment needed to control the critical angle for total internal reflection (TIRF) excitation and the wavelength of the standing-wave field is difficult due to the necessary miniaturization. The same holds true when using fiber optics to insert the interfering light into the microscope objective area. Another drawback is the partial light blocking when inserting devices into the light path of the objective (see U.S. Pat. No. 6,987,609 B2).

If a grating is used, the period and the orientation of the grating cannot be (easily) adjusted.

In (Euiheon Chung et al, Biophysical Journal, 1747-1757, 2007), another optical layout is described to generate a different standing wave excitation under total internal reflection (TIRF) condition using a beam splitter and laterally adjustable fiber tips to select the TIRF angle.

When using a prism as the specimen surface, the adjustments are somewhat less complicated, but here the sample has to be applied directly onto a surface of the prism used to generate the total internal reflection fluorescence excitation.

SUMMARY OF THE INVENTION

According to an aspect of the invention, there is provided a total internal reflection microscope, which combines a total internal reflection microscope with laterally structured excitation illumination through an objective lens.

In particular, according to an aspect there is provided a total internal reflection microscope for epi-fluorescence illumination observations, said microscope comprising an objective, through which an object to be observed is illuminated by an excitation illumination light at a predetermined or predeterminable angle with respect to an observation axis of the microscope, said angle being adjustable to be within the range suitable for a total internal reflection observation; a source of collimated excitation light; an interferometer, arranged in the optical path of the collimated excitation light, said interferometer being configured to produce an interference pattern; a focusing lens system comprising at least one focusing lens, said focusing lens system being configured to focus the interference pattern produced by the interferometer into the back focal plane of the objective; wherein the objective and the focusing lens system are configured and arranged such as to image the interference pattern produced by the interferometer into the conjugated image plane of the objective, thereby producing excitation illumination light which is spatially modulated in its intensity in a plane orthogonal to the observation axis of the microscope.

According to another aspect, there is provided a method for producing an image of an object using a total internal reflection microscope for epi-fluorescence illumination observation, the method comprising illuminating an object to be observed by an excitation illumination light at a predetermined or predeterminable angle with respect to an observation axis of said microscope, said angle being adjustable to be in the range suitable for a total internal reflection observation; detecting at least a portion of the fluorescent light emitted from the object; wherein the object is illuminated by a laterally structured illumination light, the laterally structured illumination light having an intensity which is spatially modulated in a plane orthogonal to the observation axis of the microscope, and wherein the laterally structured illumination light is produced by imaging an interference pattern produced by an interferometer into the conjugated image plane of the objective of the microscope.

The total internal reflection microscope according to an aspect of the invention may be realized to have one or more of the following advantages: One advantage of the total internal reflection microscope is that substantially the whole aperture of the objective is efficiently used for the detection, since in particular no device, respectively optical element is obstructing the light path of the microscope objective. Further a total internal reflection microscope with less costly, less critical and more stable optical setup as compared to the prior art may be realized. A further advantage is that ordinary glass slides and coverslips may be used.

Another advantage is that the period of the interference pattern and/or the total internal reflection angle and/or the orientation of the standing-wave field are easily adjustable, for example by a microscopist. In particular, the pattern period, the total internal reflection angle and/or the orientation of the standing-wave field can easily be rotated in the plane perpendicular to the axis of the microscopic observation. Thus, it is possible to obtain significantly enhanced lateral localization accuracy and optical resolution not only in one but in two axes within the field of observation on ordinary microscope slides and/or coverslips.

The above and other objects, features and advantages of the present invention will become more apparent upon reading of the following detailed description of preferred embodiments and accompanying drawings. Other features and advantages of the subject-matter described herein will be apparent from the description and the drawings and from the claims. It should be understood that even though embodiments are separately described, single features thereof may be combined to additional embodiments.

The total internal reflection interferometer according to an aspect of the invention may have various applications. In particular, the total internal reflection interferometer may be used to observe and/or measure microstructures and/or processes within a layer close to the surface of various samples with a resolution below the diffraction limit. The total internal reflection interferometer is particularly suitable for carrying out observations and/or measurements of various biological and/or tissue samples.

BRIEF DESCRIPTION OF THE DRAWINGS

The above and other aspects will now be described in detail with reference to the following drawings.

Throughout the figures same reference signs are used for the same or similar elements.

DETAILED DESCRIPTION OF THE PREFERRED EMBODIMENTS

Figure 1:
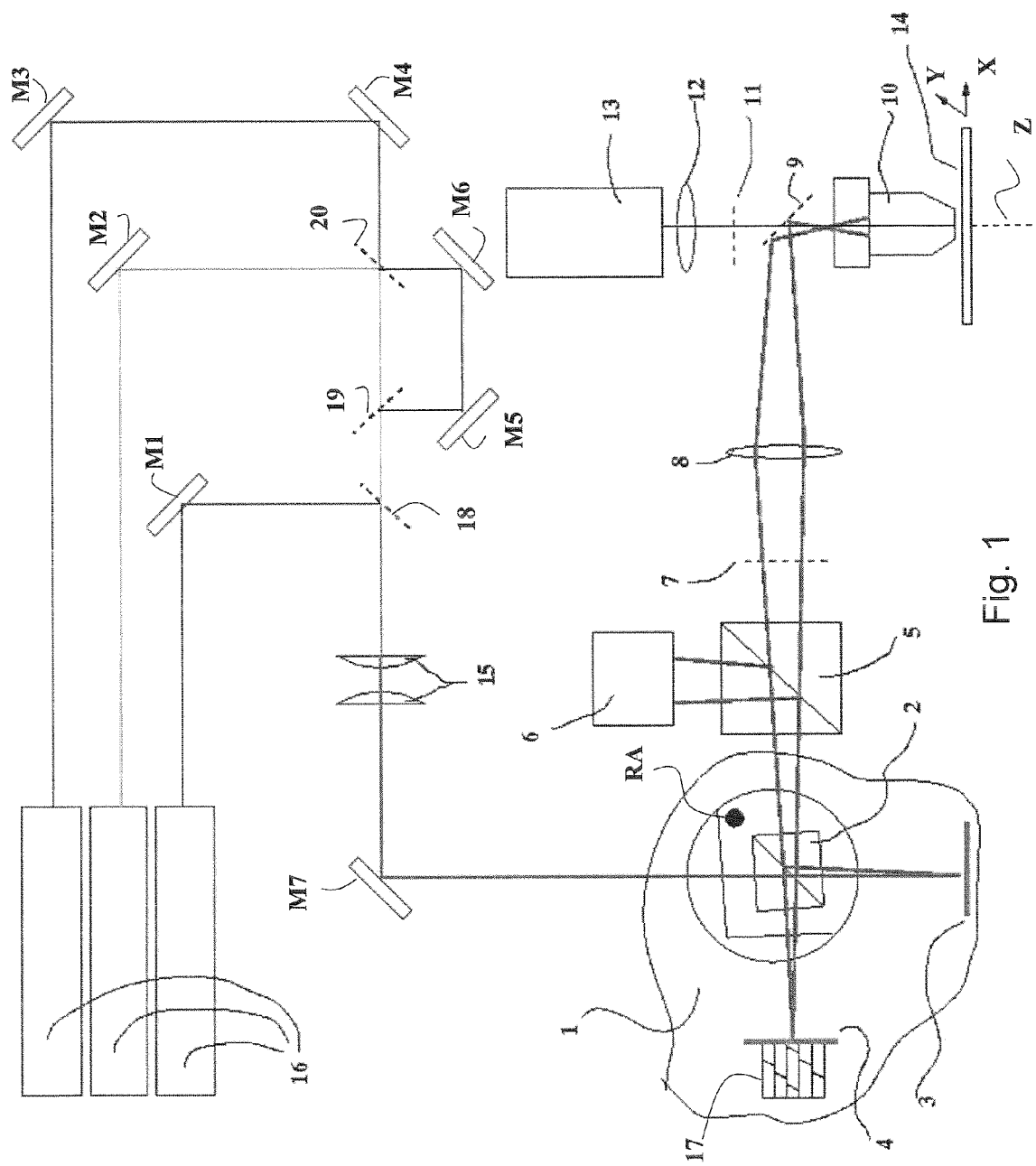
FIG. 1 shows schematically a principle optical layout of a total internal reflection microscope according to one example.

According to an example, there is provided a total internal reflection microscope for epi-fluorescent observations employing laterally structured illumination (LSI-TIRF microscope). The term "fluorescence" within the scope of this application encompasses any photon interactions, in which differences arise between the excitation spectrum and the emission spectrum of the same substance, which are not attributable to monochromatic absorption or dispersion. The term "fluorescence" may include in particular multiphoton interactions, in which the excitation wavelength can be greater than the emission wavelength. The term "fluorescence" encompasses thus the closely related phenomena of fluorescence, phosphorescence and luminescence, which differ in particular in the fluorescence lifetime.

The object, respectively specimen may be labeled by one or more fluorescent labels or dyes. For example the FISH labeling scheme or any other suitable labeling scheme may be employed. The object may be placed, respectively mounted on or in a coverslip or may be placed in a suitable culture container (for example a Petri dish).

The total internal reflection microscope may comprise an objective, through which an object to be observed is illuminated by an excitation illumination light at a predetermined or predeterminable angle with respect to the observation axis of the microscope, wherein said angle is adjustable to be within the range suitable for a total internal reflection observation. The objective comprises at least one lens. Typically the objective comprises a plurality of lenses, configured and arranged such as to reduce optical aberrations. Furthermore, the objective may be an achromat. The objective, through which the object is illuminated, is advantageously an objective having a high numerical aperture.

The total internal reflection microscope may further comprise a source of collimated excitation light, an interferometer, arranged in the optical path of the collimated excitation light, the interferometer being configured to produce an interference pattern; and a focusing lens system comprising at least one focusing lens. The focusing lens system may be configured to focus the interference pattern produced by the interferometer into the back focal plane of the objective. The objective and the focusing lens system may be configured and arranged such as to image the interference pattern produced by the interferometer into the conjugated image plane of the objective, thereby producing excitation illumination light having intensity which is spatially modulated in a plane orthogonal to the observation axis of the microscope. The observation axis of the microscope may coincide with the optical axis (Z-axis) of the microscope and/or with the optical axis of the objective.

The interferometer may be arranged or positioned in the optical path between the source of collimated excitation illumination light and the focusing lens. Other optical elements (such as for example polarizers, waveplates, aperture stops, filters, beam splitters, additional lenses, etc.) may be also arranged or positioned in the optical path between the source of collimated illumination light and the interferometer; and/or between the interferometer and the focusing lens; and/or between the focusing lens and the objective.

The interferometer may be in particular a two-beam interferometer, for example a Michelson-Morley, a Twyman-Green type interferometer, an interferometer employing a Dove-prism, or other type of interferometer.

The interferometer may produce an interference pattern in a lateral plane (i.e. in a plane which is substantially orthogonal to the axis of the outputted light beams). The produced interference pattern may be imaged by the focusing lens and the objective into the conjugated image plane of the objective to produce thereby a laterally structured excitation illumination. Laterally structured illumination is in particular an illumination which is spatially modulated in a plane substantially orthogonal to an observation axis of the microscope or in other words an illumination, wherein the intensity of the illumination light is spatially modulated in a plane orthogonal to an observation axis of the microscope. More specifically, the excitation illumination light forms a laterally structured standing wave field, i.e. a wave field, wherein the light intensity in a plane substantially orthogonal to the observation axis (observation plane or X-plane or lateral plane) is structured, respectively spatially modulated.

The object may be illuminated through the objective by the laterally structured illumination light produced by the interferometer. The objective is focused on its one side to the observed object, whilst on its conjugated image plane the interferometer rays are focused. The angle at which the illumination light is incident on the object (and more specifically to the coverslip-specimen or container-specimen interface) may be adjustable to an angle suitable for an illumination in a total internal reflection mode.

Under total internal reflection mode, the laterally structured illumination light produces a laterally structured evanescent light field, which extends a short distance (for example about 100 nm or less) in an axial direction (i.e. in a direction substantially parallel to the observation axis or the optical axis of the microscope) into the object to be observed. The laterally structured evanescent light field excites at least one fluorescent label with which the object to be observed is labeled. At least a portion of the emitted fluorescence light is detected to form an image of the observed object. The emitted fluorescence light may be detected through the same objective employed for illumination or through an additional objective.

Advantageously at least one of the angular rotation, the fringe distance and the phase of the interference pattern produced by the interferometer (and thus also of the laterally structured illumination) is adjustable. In other words, the interferometer may be configured such that the angular rotation and/or the fringe distance and/or the phase of the interference pattern (and thus also of the laterally structured illumination) are adjustable.

The interferometer may comprise a beam splitter. The beam splitter may be configured such as to be rotatable out of a zero-alignment position, wherein the rotation axis is orthogonal to the interferometer plane; and/or tiltable out of a zero-alignment position, wherein the tilt axis lies within the interferometer plane.

The beam splitter may be arranged or positioned in the optical path between the source of collimated light beam and the focusing lens system. By rotating the beam splitter out of a zero-alignment position with its rotation axis orthogonal to the interferometer plane the fringe distance of the interference pattern in the observation plane, respectively the object plane of the objective may be adjusted. Alternatively or in addition to it, the (critical) angle of incidence for total internal reflection microscopy may be adjusted by rotating the beam splitter within the interferometer with the rotation axis orthogonal to the interferometer plane.

By tilting the beam splitter out of is zero-alignment position with a tilt axis within the interferometer plane it is possible to rotate the interference pattern in the observation or object plane.

The interferometer plane may be defined by the incident interferometer beam (i.e. the incoming light beam incident onto the interferometer) and the interferometer output beams in their zero alignment position. The zero alignment position may be defined as a position in which the interferometer output beams are collinear and are substantially coinciding with each other.

The beam splitter may be a beam-splitting cube or a plate beam splitter.

The interferometer may further comprise a first mirror and a second mirror. At least one of the first mirror and the second mirror may be tiltable with regard to the zero axis of the incoming light beam. Alternatively, or in addition to it, at least one of the first mirror and the second mirror may be translatable in a direction of the incoming light beam.

By tilting at least one of the first and the second mirror with regard to the (zero) axis of the (corresponding) incoming light beam (i.e. with regard to the (zero) axis of the corresponding light beam incident on the first or the second mirror) the period and/or the orientation of the fringes of the interference pattern produced by the interferometer device may be adjusted. Consequently, it is possible to adjust the period and/or the orientation of the laterally structured illumination in the plane substantially orthogonal to the observation axis of the microscope. Alternatively, or in addition to it, it is also possible to adjust the TIRF angle. The zero axis of the incoming light beam may be defined by the output interferometer beams being in their zero alignment position.

By translating at least one of the first and the second mirrors in a direction of the incoming light beam (i.e. in a direction of the light beam incident on the respective first or second mirror), the phase of the standing wave pattern, respectively the phase of the structured illumination in the object plane may be adjusted.

The interferometer may be further configured such, that the optical path length of one of the interferometer arms is variable. This enables the movement of the interference pattern with respect to the object.

The total internal reflection microscope may further comprise a dichroic mirror capable of separating the excitation illumination light from the light emitted from the illuminated object. The dichroic mirror may be arranged such that the interference pattern produced by the interferometer is imaged at the back focal plane of the objective by a reflection on the dichroic mirror or through the dichroic mirror.

The total internal reflection microscope may further comprise a detection system configured to collect and detect at least a portion of the fluorescent light emitted from the illuminated object.

The same objective which is used for illumination may be also used to form an image of the object by the fluorescence light emitted from the object. Thus, the same objective may be shared by both the illumination system (comprising in particular also the source of collimated light, the interferometer, the focusing lens system and optionally further optical elements) and the detection system.

The detection system may, however, comprise a second objective, for example a second opposing objective, arranged and configured such as to produce an image of the object formed by the fluorescent light emitted from the illuminated object. The second objective may be arranged such as to be opposite to the objective through which the object is illuminated.

The detection system may further comprise a detector, for example a two-dimensional detector configured to detect the image of the object formed by the fluorescent light emitted from the illuminated object. The detector may be for example a CCD camera.

The total internal reflection microscope may further comprise an object stage, configured such as move or translate the object mounted on the object stage along an X-axis and/or a Y-axis in the plane orthogonal to the observation axis of said microscope. This corresponds to a phase modulation of the standing wave excitation light with regard to the object.

The Y-axis is orthogonal to the X-axis, both X and Y axis lying in a plane orthogonal to a microscopic optical Z-axis (i.e. in the observation plane or X-Y plane). With the help of the object stage the object may be moved through the laterally structured standing wave illumination, respectively through the interference pattern.

The total internal reflection microscope may further comprise a camera configured and arranged such as to monitor the spatially modulated illumination light in the conjugated image plane of the object. In particular, the spatially modulated illumination light can be monitored by a camera positioned in the sum signal side of the interferometer.

The source of collimated excitation light may be configured to produce multi-wavelength illumination light. In particular, the source of collimated excitation light may be configured such as to produce a plurality of collimated excitation light beams, having different wavelengths. The plurality of collimated excitation light beams may be collinear and may further substantially overlap with each other. The plurality of collimated excitation light beams may thus form a single multi-spectral or multi-wavelength collimated excitation beam.

The total internal reflection microscope may further comprise a collimator. The collimator may be positioned in front of the interferometer, i.e. in the optical path of the incident interferometer beam. The collimator may be an adjustable collimator, with the help of which the size of the illuminated field may be adjusted.

The source of collimated excitation light may comprise one or more lasers or one or more (conventional) light sources, which produce collimated beams having different wavelengths. In addition, the source of collimated excitation light may comprise a collimator, which is arranged in the optical path of the laser beams.

According to another aspect, a method for producing an image of an object using a total internal reflection microscope for epi-fluorescence illumination observation may comprise: illuminating an object to be observed by an excitation illumination light at a predetermined or predeterminable angle with respect to an observation axis of the microscope, said angle being adjustable to be in the range suitable for a total internal reflection observation; detecting at least a portion of the fluorescent light emitted from the object; wherein the object is illuminated by a laterally structured illumination light, the laterally structured illumination light having an intensity which is spatially modulated in a plane orthogonal to the observation axis of the microscope, and wherein the laterally structured illumination light is produced by imaging an interference pattern produced by an interferometer into the conjugated image plane of the objective of the microscope.

Figure 2:
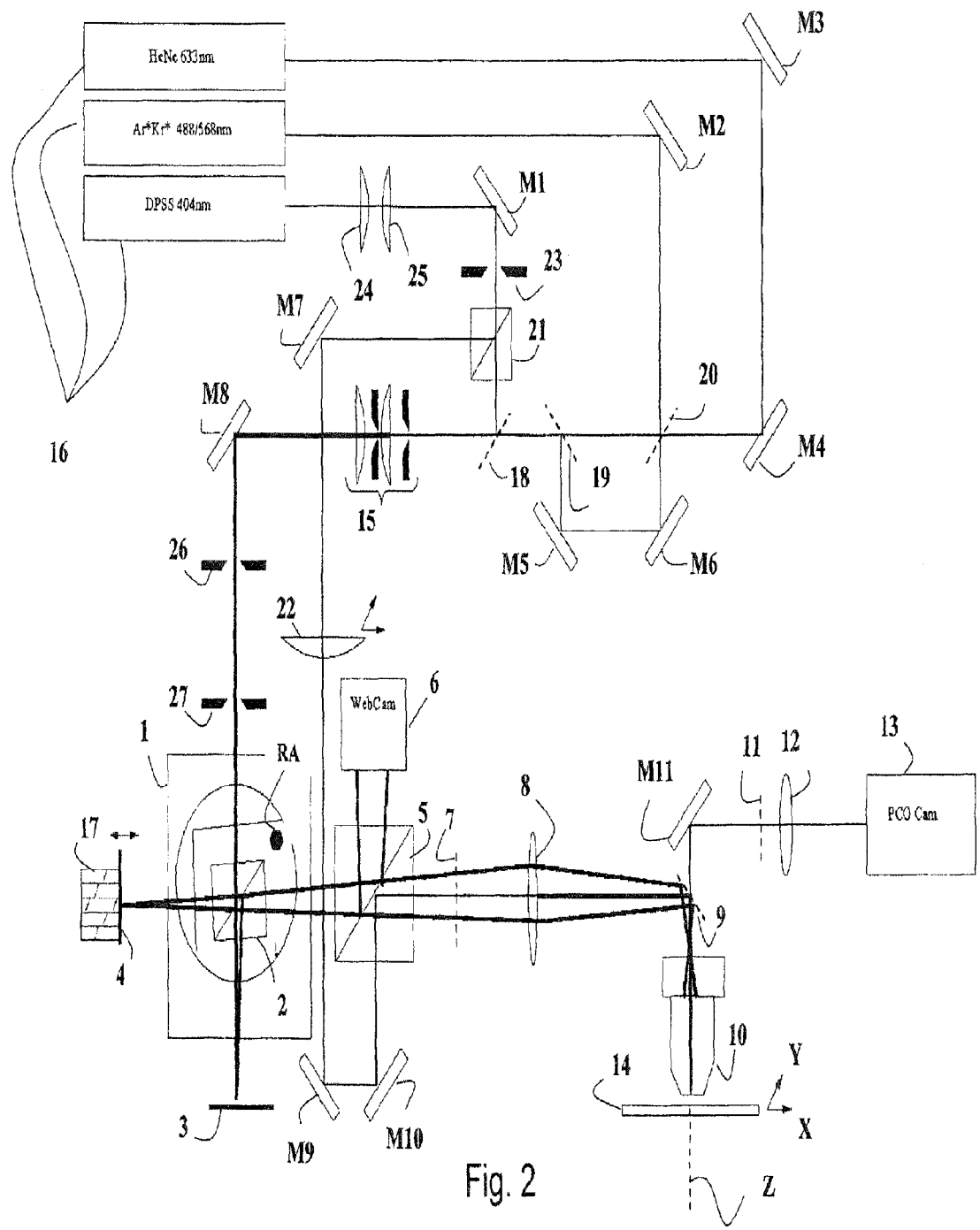
FIG. 2 shows schematically a principle optical layout of a total internal reflection microscope according to another example.

Principle optical layouts of total internal reflection microscopes according to two examples are schematically shown in FIG. 1 and FIG. 2. FIG. 1 and FIG. 2 show only examples of possible optical layouts, which can be modified by those skilled in the art in many other ways without departing from the scope of the invention. Thus, for example, one of the plane reflecting mirrors 3 or 4 can be replaced by a reflecting surface on a beam splitter cube itself, etc. In FIGS. 1 and 2 same reference numbers refer to the same or similar elements.

The total internal reflection microscope shown in FIG. 1 comprises a conventional epi-fluorescence microscope in connection with an interferometer 1. The interferometer 1 comprises a tiltable and rotatable beam splitter 2 and two plane mirrors 3 and 4. The beam splitter 2 splits the incoming collimated light beam into two coherent beams. The two coherent beams are reflected by the two mirrors 3 and 4 and combined to produce an (output) interference pattern.

The beam splitter 2 may be a non-polarizing 50:50 beam splitter. The beam splitter 2 is configured such as to be rotatable in the plane of the drawing. In other words, the beam splitter 2 is configured such as to be rotatable with the rotation axis RA orthogonal to the plane of the drawing or orthogonal to the interferometer plane. The beam splitter 2 is in particular rotatable with respect to the two plane mirrors 3 and 4. To this end, the beam splitter 2 may be mounted on a rotary table or a turntable.

In addition, the beam splitter 2 may be configured such as to be tiltable with respect to the plane of drawing (i.e. with respect to the interferometer plane). By tiling the beam splitter 2 the period and/or the orientation of the interference fringe pattern in the object plane may be suitably selected. For this the beam splitter may be mounted on a kinematic lens holder, which in turn is mounted on a rotary table or a turntable.

The rotary table or turntable may be mounted on a linear translation stage, which enables the adjustment of the optical path length in the interferometer arms. Thus, for example, the optical path length in the interferometer arms may be adjusted to correspond to the coherence length of the light source(s).

Further, the optical path length between either one of the plane mirrors 3 or 4 and the beam splitter 2 may be adjustable in order to move, respectively adjust the phase of the interference fringe pattern in the object plane. To this end, one of the plane mirrors 3, 4 or the two plane mirrors 3, 4 may be mounted on a piezo-actuator 17.

The control of all movable elements, including for example the rotary table, and/or the linear translation stage and/or the piezo-actuator may be achieved by a computer or a computer system, by an embedded microprocessor or an embedded microprocessor system or the like. By rotating and/or tilting and/or translating the beam splitter and/or the plane mirrors, it is possible to generate an interference pattern, which is freely adjustable in a (lateral) plane. In particular, it is possible to adjust the width, the orientation and/or the phase of the interference pattern. Furthermore, it is possible to realize an illumination mode, in which the object is illuminated by a laser light, which is not incident in a total reflection mode. This mode enables for example easier focusing. In a second mode, the object is illuminated in a total internal reflection mode.

The total internal reflection microscope may comprise a shutter which may be arranged or positioned in front of one of the interferometer mirrors 3, 4. With the help of the shutter it is possible to switch between a mode, in which the object is illuminated with non-structured illumination and a mode, in which the object is illuminated with laterally structured illumination.

A second beam splitter 5 in connection with a camera 6 (for example a CCD camera, television camera, etc.) may be provided. The second beam splitter 5 enables the monitoring of the interference fringe pattern imaged into the object plane. The second beam slitter 5 is arranged or positioned between the interferometer and a focusing lens 8 (which constitutes in this case the focusing lens system).

A waveplate 7 may be positioned between the interferometer and the focusing lens 8. The waveplate 7 may be used to adjust the polarization of the excitation illumination light. Furthermore, with the help of the waveplate 7 it may be possible to carry out polarization-dependent excitation of the fluorescent labels. The waveplate 7 may be mounted on a further rotary table to enable a variable adjustment of the polarization of the excitation illumination light.

The focusing lens 8 is focused on its one side onto the beam splitting plane of the beam splitter 2 and on its other side into the back focal plane of the objective 10 after reflection on a dichroic mirror 9. The dichroic mirror 9 separates the fluorescence emission from the excitation wavelengths. The focusing lens 8 may be a lens having a long focal length (for example f=500 mm). The objective 10 may be an objective having a high numerical aperture. The objective may be translatable along the optical axis Z with the help of a focusing piezo-unit.

The focusing lens 8 and the objective 10 form a collimator. Thus, the laser beams from the interferometer are coupled into the objective at an angle, which is below the (critical) angle for total internal reflection, the beams exiting the objective are collimated and the object is illuminated by interference with a constant pattern. A further advantage of the focusing lens 8 may be that it reduces the diameter of the (focused) light beam or spot in the back focal plane of the objective (for example to a few 10 µm), so as to enable a total reflection at an angle greater than the critical angle for total internal reflection.

Blocking filter 11, tube lens 12 and an observation camera 13 constitute the detection path of a conventional epi-fluorescence microscope with the object (or specimen or sample) being mounted on a slide 14. The observation camera 13 may be a CCD camera, in particular a cooled CCD camera.

The source of collimated excitation light may be a multi-spectral source or multi-wavelength source. For this the source of collimated excitation light may comprise one or more collinearly adjusted excitation laser sources 16. The excitation laser sources may be for example a HeNe laser emitting light with a wavelength 633 nm, Ar*Kr* laser emitting light with wavelengths 488 and 568 nm and a DPSS emitting light with wavelength of 404 nm. The laser beams emitted from each of the laser sources 16 may be coupled together to form a single (multi-spectral or multi-wavelength) beam, which then passes trough the collimator 15. The coupling may be achieved with the help of dichroic mirrors 18, 19 and 20. Collimator 15 may be used to optimally adjust the laser beam diameter of the one or more collinearly adjusted excitation laser sources 16. In other words, the collimator 15 may be used to adjust the beam diameter of the multi-spectral or multi-wavelength beam of excitation light.

FIG. 2 shows the principle optical layout of a total internal reflection microscope according to another example. The total internal reflection microscope according to this example comprises in addition to the optical elements described with respect to FIG. 1, further a third beam splitter 21 and a lens 22. The third beam splitter 21 separates or splits off a part of the light emitted from one of the laser sources (in this case the DPSS source emitting UV light with wavelength of 404 nm). The separated or split-off part forms an UV-micro-beam, which is coupled to the objective 10. The lens 22 and the focusing lens 8 form a collimator. The collimated UV-microbeam is focused in the object plane (for example to a diameter of about 1.5 µm). The source of collimated excitation light comprises an aperture stop or diaphragm 23 and two lenses 24 and 25, arranged in the optical path of the laser beam emitted from the third laser source (DPSS laser) between the laser source and the third beam splitter 21. Lenses 24 and 25 may form a collimator.

Furthermore, the total internal reflection microscope comprises apertures or diaphragms 26 and 27, which the help of which a central part of the collimated excitation beam may be selected.

The total internal reflection microscope in the examples shown in FIG. 1 and FIG. 2 may comprise further a plurality of mirrors M1 to M11, so as to direct the light beams.

Further examples concern in particular a microscope for total internal reflection epi-fluorescence illumination observations using a laterally structured excitation illumination with a freely adjustable interference pattern with respect to angular rotation and standing wave fringe distance by imaging this structured illumination generated by an interferometer into the conjugated image plane of the microscope objective, comprising a beam splitter or beam splitter device positioned between the collimated excitation light source and a lens to focus the excitation interference light pattern into the back focal plane of the microscope objective.

The interference pattern may be imaged by reflection on a dichroic mirror which splits the excitation from the emission image. Alternatively the interference pattern may be imaged through the dichroic mirror which splits the excitation from the emission image.

The emission image may be observed by an opposite objective.

The microscope may use lasers and/or conventional light sources to generate the structured illumination.

The beam splitter within the interferometer may be configured such that it can be rotated out of its zero-alignment position with the rotation axis orthogonal to the interferometer plane to adjust the desired fringe distance in the object plane of the objective. It is also possible that the beam splitting device remains in a fixed position and both interferometer mirrors can be tilted with regard to the zero axis of the incoming light beams in order to adjust the fringe pattern period and orientation as well as the TIRF angle.

In an example one of the interferometer mirrors can be moved in the direction of the incoming light beam in order to adjust the phase of the standing wave pattern in the object plane.

In addition or alternatively, the beam splitter within the interferometer may be configured such that it can be tilted out of is zero-alignment position with the tilt axis within the plane of the interferometer to rotate the fringe pattern in the object plane.

The beam splitter or the beam-splitting device may be for example a beam-splitting cube or a plate beam splitter.

In an example the critical angle of incidence for total internal reflection microscopy may be adjusted by rotating the beam-splitting device within the interferometer with the rotation axis orthogonal to the interferometer plane. Further, the object may be moved with respect to the fringe pattern by moving the object stage orthogonally in the X and/or Y-axis with respect to the microscope optical Z-axis. In addition or alternatively, the fringe pattern with respect to the object may be moved by varying the optical path length in one of the interferometer arms.

In an example the interference pattern in the conjugated image plane of the object may be monitored by a camera positioned in the sum signal side of the interferometer.

The microscope may employ more than one excitation wavelengths.

The total internal reflection interferometer employing laterally structured illumination (LSI-TIRF) may have various applications. In particular, the LSI-TIRF may be used to observe and/or measure microstructures within a layer close to the surface of various samples with a resolution below the diffraction limit. The resolution of the total internal reflection interferometer employing laterally structured illumination may be as high as 100 nm. Lateral positions of small fluorescent objects can be measured with an accuracy in the nanometer range, for example with an accuracy in the 5 nm range. The total internal reflection interferometer employing laterally structured illumination is in particular suitable for the carrying out observation and/or measurements of various biological samples, such as for example dermatological samples and/or for observation/detection of macula degeneration. To this end the total internal reflection interferometer may be configured for observation of cells/cell samples, which are immersed in fluids and placed in a suitable container, for example in Petri dishes.

What is claimed is:

1. A total internal reflection microscope for epi-fluorescence illumination observations, said microscope comprising
an objective, through which an object to be observed is illuminated by an excitation illumination light at an angle with respect to an observation axis of said microscope, said angle being adjustable to be within a range suitable for a total internal reflection observation;
a source of collimated excitation light;
an interferometer, arranged in an optical path of the collimated excitation light, said interferometer being configured to produce an interference pattern;
a focusing lens system comprising at least one focusing lens, said focusing lens system being configured to focus the interference pattern produced by the interferometer into a back focal plane of the objective;
wherein the objective and the focusing lens system are configured and arranged to produce excitation illumination light which is spatially modulated in its intensity in a plane orthogonal to the observation axis of said microscope.

2. The total internal reflection microscope of claim 1, wherein at least one of an angular rotation, a fringe distance and a phase of the interference pattern is adjustable.

3. The total internal reflection microscope of claim 1, wherein the interferometer is a Michelson-Morley or a Twyman-Green type interferometer.

4. The total internal reflection microscope of claim 1, wherein the interferometer comprises a beam splitter configured to achieve at least one of
rotation out of a zero-alignment position, wherein a rotation axis is orthogonal to an interferometer plane and tilting out of a zero-alignment position, wherein a tilt axis lies within the interferometer plane.

5. The total internal reflection microscope of claim 4, where the beam splitter is a beam-splitting cube or a plate beam splitter.

6. The total internal reflection microscope of claim 1, wherein the interferometer comprises a first mirror and a second mirror, at least one of the first and second mirrors being movable to achieve at least one of:
- a tilting of at least one of the first mirror and the second mirror with regard to a zero axis of the incoming light beam; and
- a translation of at least one of the first mirror and the second mirror in a direction of the incoming light beam.

7. The total internal reflection microscope of claim 1 further comprising a dichroic mirror capable of separating the excitation illumination light from a light emitted from the illuminated object, wherein the dichroic mirror is arranged such that the interference pattern produced by the interferometer is imaged at the back focal plane of the objective by either a reflection on the dichroic mirror or through the dichroic mirror.

8. The total internal reflection microscope of claim 1, further comprising a detection system configured to collect and detect at least a portion of the fluorescent light emitted from the illuminated object.

9. The total internal reflection microscope of claim 8, wherein the detection system comprises a second objective, arranged and configured to produce an image of the object formed by the fluorescent light emitted from the illuminated object.

10. The total internal reflection microscope of claim 1, further comprising an object stage, configured to move the object mounted on the object stage along at least one of an X-axis and/or a Y-axis in a plane orthogonal to the observation axis of said microscope.

11. The total internal reflection microscope of claim 1, wherein the interferometer is configured such, that an optical path length of an interferometer arm is variable.

12. The total internal reflection microscope of claim 1, further comprising a camera configured and arranged to monitor the spatially modulated illumination light in the conjugated image plane of the object.

13. The total internal reflection microscope of claim 1, wherein the source of collimated excitation light is configured to produce multi-wavelength illumination light.

14. The total internal reflection microscope of claim 1 further comprising a collimator.

15. A method for producing an image of an object using a total internal reflection microscope for epi-fluorescence illumination observation, comprising
- illuminating an object to be observed by an excitation illumination light at a predetermined or predeterminable angle with respect to an observation axis of the microscope, said angle being adjustable to be in a range suitable for a total internal reflection observation;
- detecting at least a portion of the fluorescent light emitted from the object;
- wherein the object is illuminated by a laterally structured illumination light, the laterally structured illumination light having an intensity which is spatially modulated in a plane orthogonal to the observation axis of the microscope, and
- wherein the laterally structured illumination light is produced by imaging an interference pattern produced by an interferometer into a back focal plane of an objective of the microscope.

* * * * *